US012652588B2

(12) United States Patent
Pu et al.

(10) Patent No.: US 12,652,588 B2
(45) Date of Patent: Jun. 9, 2026

(54) NOTIFICATION METHOD AND APPARATUS FOR RETURNING TO NETWORK, AND TERMINAL

(71) Applicant: VIVO MOBILE COMMUNICATION CO., LTD., Dongguan (CN)

(72) Inventors: Wenjuan Pu, Dongguan (CN); Wei Bao, Dongguan (CN); Xiaodong Yang, Dongguan (CN); Xuanbing Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 311 days.

(21) Appl. No.: 18/222,472

(22) Filed: Jul. 16, 2023

(65) Prior Publication Data

US 2023/0370911 A1 Nov. 16, 2023

Related U.S. Application Data

(63) Continuation of application No. PCT/CN2022/071314, filed on Jan. 11, 2022.

(30) Foreign Application Priority Data

Jan. 15, 2021 (CN) .......................... 202110057640.6

(51) Int. Cl.
*H04W 36/00* (2009.01)
*H04W 60/04* (2009.01)
(Continued)

(52) U.S. Cl.
CPC ....... *H04W 36/0072* (2013.01); *H04W 60/04* (2013.01); *H04W 36/1443* (2023.05); *H04W 88/06* (2013.01)

(58) Field of Classification Search
CPC ............. H04W 36/0072; H04W 60/04; H04W 36/1443; H04W 88/06; H04W 60/06;
(Continued)

(56) References Cited

U.S. PATENT DOCUMENTS 10,791,209 B2 * 9/2020 Koizumi ........... H04M 1/72412
2020/0267752 A1 * 8/2020 Mukherjee ........ H04W 28/0278
(Continued)

FOREIGN PATENT DOCUMENTS

CN 104303549 A 1/2015
CN 105103611 A 11/2015
(Continued)

OTHER PUBLICATIONS

International Search Report issued in corresponding International Application No. PCT/CN2022/071314, mailed Mar. 28, 2022, 5 pages.
(Continued)

*Primary Examiner* — Kabir A Timory
(74) *Attorney, Agent, or Firm* — IPX PLLC

(57) ABSTRACT

This application discloses a notification method and apparatus for returning to a network, and a terminal. The notification method is performed by a terminal, including: determining whether to send a return notification to a network; and when it is determined to send the return notification to the network, sending the return notification to the network.

20 Claims, 4 Drawing Sheets

(51) Int. Cl.
 *H04W 36/14* (2009.01)
 *H04W 88/06* (2009.01)

(58) Field of Classification Search
 CPC ... H04W 76/25; H04W 60/005; H04W 8/183;
 H04W 36/0066
 See application file for complete search history.

(56) References Cited

U.S. PATENT DOCUMENTS

| | | | | |
|---|---|---|---|---|
| 2021/0014928 A1* | 1/2021 | Zheng | ............... | H04W 52/0229 |
| 2022/0053448 A1* | 2/2022 | Velev | .................... | H04W 76/27 |
| 2022/0240326 A1* | 7/2022 | Rune | ................. | H04W 74/0866 |
| 2024/0015616 A1* | 1/2024 | Wang | .............. | H04W 36/00837 |

FOREIGN PATENT DOCUMENTS

| | | |
|---|---|---|
| CN | 108337743 A | 7/2018 |
| CN | 108696934 A | 10/2018 |
| CN | 108965306 A | 12/2018 |
| CN | 109417697 A | 3/2019 |
| CN | 109429280 A | 3/2019 |
| CN | 111758282 A | 10/2020 |
| CN | 113225778 A | 8/2021 |
| JP | 5288925 B2 | 9/2013 |
| JP | 2019521617 A | 7/2019 |
| WO | 2018232560 A1 | 12/2018 |
| WO | 2019183792 A1 | 10/2019 |
| WO | 2020191524 A1 | 10/2020 |
| WO | 2020252795 A1 | 12/2020 |

OTHER PUBLICATIONS

Extended European Search Report issued in related European Application No. 22738998.8, mailed May 23, 2024, 9 pages.
First Office Action issued in related Chinese Application No. 202110057640.6, mailed Jun. 27, 2024, 7 pages.
Notice of Reason for Refusal issued in related Japanese Application No. 2023-542744, mailed May 14, 2024, 6 pages.

* cited by examiner

| LCG ID | Amount of data to be transmitted (buffer size) |
|--------|------------------------------------------------|

Oct 1

Determine whether to send a return
notification to a network    ⌐101

If it is determined to send the return
notification to the network, send the
return notification to the network    ⌐102

LCID field

| LCID field | MAC protocol data unit |

NOTIFICATION METHOD AND APPARATUS FOR RETURNING TO NETWORK, AND TERMINAL

CROSS-REFERENCE TO RELATED APPLICATIONS

This application is a continuation of International Application No. PCT/CN2022/071314, filed Jan. 11, 2022, which claims priority to Chinese Patent Application No. 202110057640.6, filed Jan. 15, 2021. The entire contents of each of the above-referenced applications are expressly incorporated herein by reference.

TECHNICAL FIELD

This application relates to the field of communications technologies, and in particular, to a notification method and apparatus for returning to a network, and a terminal.

BACKGROUND

Currently, there is not only a single-SIM terminal, but also a dual-SIM or multi-SIM terminal in the market, and both the dual-SIM terminal and the multi-SIM terminal are referred to as the multi-SIM terminal. The capability of the multi-SIM terminal may be single sending and single receiving, single sending and dual receiving, dual sending and dual receiving, and the like.

One feature of the multi-SIM terminal is to simultaneously camp on a plurality of networks, but implementations of different multi-SIM terminals are different, and some multi-SIM terminals can simultaneously perform sending and receiving on the plurality of networks without affecting each other. However, some multi-SIM terminals can simultaneously camp on a plurality of networks, but may camp on two networks in a time division manner, that is, the multi-SIM terminal camps on a network A for a period of time and listens to paging of the network A, and the multi-SIM terminal camps on a network B for a period of time and listens to paging of the network B; or is in a connection state in the network A for a period of time to send and receive data, and receives paging in the network B for a period of time; or sends and receives data in the network A for a period of time, and establishes a connection in the network B for sending and receiving data for a period of time.

The multi-SIM terminal is in a connection state in the network A, and may leave the network A and switch to the network B to perform some services. When the multi-SIM terminal is ready to switch from the network A to the network B, the multi-SIM terminal can send a leave notification to the network A, so that the network A can avoid scheduling or paging the multi-SIM terminal during this time after receiving the leave notification sent by the multi-SIM terminal, thus saving network resources.

Currently, it is not clear how to notify the network when the multi-SIM terminal returns to the network. In this case, the UE may fail to notify a network side that the UE has returned to the network, thus causing the UE to be always unable to receive or send data, or under some conditions, the UE sends unnecessary notifications, wasting network resources.

SUMMARY

Embodiments of this application provide a notification method and apparatus for returning to a network, and a terminal.

According to a first aspect, an embodiment of this application provides a notification method for returning to a network, performed by a terminal, including:

determining whether to send a return notification to a network; and if it is determined to send the return notification to the network, sending the return notification to the network.

According to a second aspect, an embodiment of this application provides a notification apparatus for returning to a network, applied to a terminal, including:

a determining module, configured to determine whether to send a return notification to a network; and a sending module, configured to: if it is determined to send the return notification to the network, send the return notification to the network.

According to a third aspect, an embodiment of this application further provides a terminal, including a processor, a memory, and a program or an instruction stored in the memory and executable on the processor, where when the program or the instruction is executed by the processor, steps of the notification method for returning to a network are implemented.

According to a fourth aspect, an embodiment of this application provides a readable storage medium, where the readable storage medium stores a program or an instruction, and when the program or the instruction is executed by a processor, steps of the notification method for returning to a network are implemented.

According to a fifth aspect, an embodiment of this application provides a chip. The chip includes a processor and a communications interface. The communications interface is coupled to the processor. The processor is configured to run a program or an instruction to implement the method according to the first aspect.

According to a sixth aspect, an embodiment of this application provides a computer program product, the computer program product is stored in a nonvolatile storage medium, and the computer program product is executed by at least one processor to implement the method according to the first aspect.

In the embodiments of this application, the terminal determines whether to send the return notification to the network, and if it is determined to send the return notification to the network, the terminal sends the return notification to the network, so that the terminal can timely and effectively notify a network side that the terminal has returned to the network, enabling the terminal to receive or send data normally.

Under some conditions, for example, when other behaviors of the terminal are triggered to cause uplink sending, the terminal can also notify the network that the terminal has returned to the network without sending unnecessary return notifications, thus saving network resources.

BRIEF DESCRIPTION OF DRAWINGS

To describe the technical solutions in the embodiments of this application more clearly, the following briefly describes the accompanying drawings for describing the embodiments of this application. Apparently, the accompanying drawings in the following description show merely some embodiments of this application, and a person of ordinary skill in the art may derive other drawings from these accompanying drawings without creative efforts.

DETAILED DESCRIPTION

Figure 1:
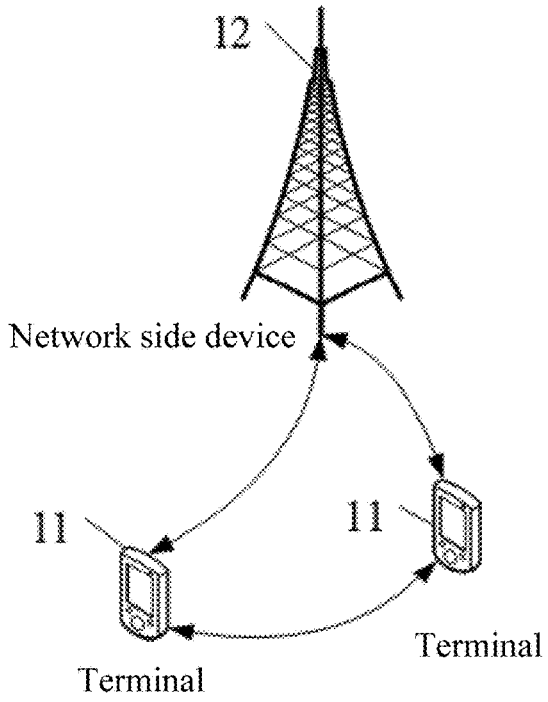
FIG. 1 is a schematic diagram of a wireless communications system.

The following clearly describes technical solutions in embodiments of this application in conjunction with the accompanying drawings in the embodiments of this application. Clearly, the described embodiments are some but not all of the embodiments of this application. All other embodiments obtained by a person of ordinary skill in the art based on the embodiments of this application shall fall within the protection scope of this application.

The terms "first", "second", and the like in the description and the claims of this application are used to distinguish between similar objects instead of describing a specific order or sequence. It should be understood that data used in this way may be interchangeable in appropriate cases, so that the embodiments of this application can be implemented in a sequence other than those shown or described herein. In addition, in the specifications and the claims, "and/or" represents at least one of connected objects, and a character "/" generally represents an "or" relationship between associated objects.

The technology described in this specification is not limited to a Long Term Evolution (LTE)/LTE-Advanced (LTE-A) system, and may also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" are often interchangeably used. The CDMA system can implement radio technologies such as CDMA2000 and Universal Terrestrial Radio Access (UTRA). UTRA includes wideband CDMA (WCDMA) and another CDMA variation. A TDMA system may implement a radio technology, for example, Global System for Mobile Communication (GSM). An OFDMA system can implement radio technologies, such as Ultra Mobile Broadband (UMB), evolved-UTRA (E-UTRA), IEEE 802.11 (Wi-Fi), IEEE 802.16 (WiMAX), IEEE 802.20, and Flash-OFDM. UTRA and E-UTRA are parts of a Universal Mobile Telecommunications System (UMTS). LTE and more advanced LTE (for example, LTE-A) are new UMTS versions that use E-UTRA. UTRA, E-UTRA, UMTS, LTE, LTE-A and GSM are described in documents from an organization named "3rd generation partnership project" (3GPP). CDMA2000 and UMB are described in the literature from an organization called "3rd Generation Partnership Project 2" (3GPP2). The technologies described in this specification may be used in the systems and radio technologies mentioned above, and may also be used in another system and radio technology. The following descriptions describe an NR system for example purposes, and NR terms are used in most of the following descriptions, although these techniques can also be applied to an application other than an NR system application.

The following description provides examples without limiting the scope, applicability, or configuration set forth in the claims. The functions and arrangements of the elements under discussion may be changed without departing from the spirit and scope of the present disclosure. In the examples, various procedures or components may be appropriately omitted, replaced, or added. For example, the described method may be performed in an order different from that described, and steps may be added, omitted, or combined. In addition, features described with reference to some examples may be combined in other examples.

Referring to FIG. 1, which is a block diagram of a wireless communications system to which this embodiment of this application can be applied. The wireless communications system includes a terminal 11 and a network side device 12. The terminal 11 may be referred to as a terminal device or User Equipment (UE). The terminal 11 may be a terminal side device such as a mobile phone, a tablet personal computer, a laptop computer, a personal digital assistant (PDA), a mobile Internet device (MID), a wearable device, or an in-vehicle device. It should be noted that a specific type of the terminal 11 is not limited in this embodiment of this application. The network side device 12 may be a base station or a core network. The base station may be a base station of 5G or a later version (for example, gNB or 5G NR NB), or a base station in another communications system (for example, an eNB, a WLAN access point, or another access point), or a location server (for example, an E-SMLC or a Location Manager Function (LMF)). The base station may be referred to as a NodeB, an evolved NodeB, an access point, a Base Transceiver Station (BTS), a radio base station, a radio transceiver, a Basic Service Set (BSS), an Extended Service Set (ESS), a home NodeB, a home evolved NodeB, a WLAN access point, a Wi-Fi node, or another appropriate term in the art. As long as a same technical effect is achieved, the base station is not limited to a specified technical term. It should be noted that, in the embodiments of this application, only a base station in an NR system is used as an example, but a specific type of the base station and a specific communications system are not limited in the embodiments of this application.

Currently, there is not only a single-SIM terminal, but also a dual-SIM or multi-SIM terminal in the market, and both the dual-SIM terminal and the multi-SIM terminal are referred to as the multi-SIM terminal. A capability of the multi-SIM terminal may be single sending and single receiving, single sending and dual receiving, dual sending and dual receiving, and the like.

One feature of the multi-SIM terminal is to simultaneously camp on a plurality of networks. The multi-SIM terminal is in a connection state in the network A, and may leave the network A and switch to the network B to perform some services. When the multi-SIM terminal is ready to switch from the network A to the network B, the multi-SIM terminal can send a leave notification to the network A, so that the network A can avoid scheduling or paging the multi-SIM terminal during this time after receiving the leave notification sent by the multi-SIM terminal, thus saving network resources.

Figure 2:
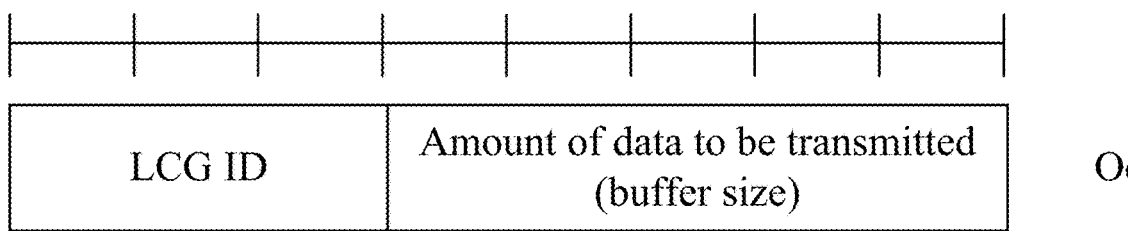
FIG. 2 is a schematic diagram of a format of a BSR.

When the UE has buffered uplink data to send, the UE can send a Buffer status report (BSR) to the network side, which indicates a buffer size of one or more logical channel groups (that is, an amount of data to be transmitted). The network side can allocate an appropriate size of uplink resources to the UE for uplink transmission based on a size of the amount of data indicated in the BSR. The BSR includes 5 kinds of format: a short BSR format, a long BSR format, a short truncated BSR format, a long truncated BSR format, and a pre-emptive BSR format. A format of the existing BSR is shown in FIG. 2. An LCG ID is a Logical Channel Group (LCG) ID, a buffer size is an amount of data to be transmitted corresponding to the LCG ID, and a MAC CE is a Medium Access Control (MAC) Control Element (CE).

Figures 3, 4:
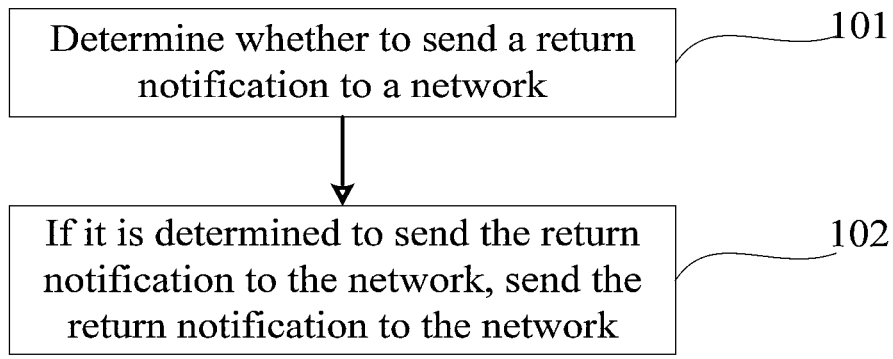
FIG. 3 is a flowchart of a notification method for returning to a network according to an embodiment of this application.
FIG. 4 and FIG. 5 are schematic diagrams of a format of a MAC CE according to an embodiment of this application.

An embodiment of this application provides a notification method for returning to a network, performed by a terminal. As shown in FIG. 3, the method includes the following steps.

Step 101: Determine whether to send a return notification to a network.

Step 102: If it is determined to send the return notification to the network, send the return notification to the network.

In this embodiment, the terminal determines whether to send the return notification to the network, and if it is determined to send the return notification to the network, the terminal sends the return notification to the network, so that the terminal can timely and effectively notify a network side that the terminal has returned to the network, enabling the terminal to receive or send data normally. Under some conditions, for example, when other behaviors of the terminal are triggered to cause uplink sending, the terminal can also notify the network that the terminal has returned to the network without sending unnecessary return notifications, thus saving network resources.

In some embodiments, the determining whether to send a return notification to a network includes:

determining to send the return notification to the network when a preset condition is met, where the preset condition includes at least one of the following items.

A first preset condition: when the terminal returns to the network, there is no uplink data and/or signaling to be sent, where the first preset condition is determined based on at least one of the following:

an indication of a MAC layer of the terminal, an indication of a Radio Resource Control (RRC) layer of the terminal, an indication of a Service Data Adaptation Protocol (SDAP) layer of the terminal, an indication of a Packet Data Convergence Protocol (PDCP) layer of the terminal, or an indication of a physical (PHY) layer of the terminal. It can be understood that there may be a request and response process between different protocol layers of the terminal. For example, the RRC layer of the terminal requests the MAC layer of the terminal to indicate whether the terminal currently has uplink data or signaling to be sent (for example, there is data in the buffer). When there is uplink data or signaling to be sent, the MAC layer of the terminal sends indication information to the RRC layer. In an implementation, when the terminal returns to the network, at least one of SDAP, PDCP, RRC, MAC, or PHY of the terminal is recovered or restarted, and new uplink data is generated after recovery or restart.

A second preset condition: when the terminal returns to the network, no Buffer Status Report (BSR) is triggered.

A third preset condition: when the terminal returns to the network, the buffer status report (BSR) is triggered, but there is no resource for sending the BSR. For example, the terminal has no Physical Uplink Shared Channel (PUSCH) resource, or the terminal has no resource dedicated to sending the BSR.

A fourth preset condition: when the terminal returns to the network, there is uplink data to be sent, but the uplink data has triggered the BSR, and there is no resource for sending the uplink data.

The resource for sending the uplink data includes a configured grant or a dynamic grant. For example, before leaving the network, UE triggers the BSR, and the network can allocate some transmission resources for the UE based on the BSR. Then, because the UE leaves the network, the network decides to temporarily suspend the allocated transmission resources, that is, the UE cannot use these resources for transmission. When the UE returns to the network, these resources are still in a suspended state, and the UE may not be able to trigger the BSR at this time because the UE doesn't meet triggering conditions of the BSR. As a result, the suspended transmission resources cannot be recovered. In this case, the UE should send the return notification to a network side.

A fifth preset condition: the network configures the terminal to send the return notification.

A sixth preset condition: before returning to the network, the terminal leaves the network based on first indication information of the network. In an implementation, before leaving the network, the terminal sends a leave request to the network side, and the network side sends the first indication information after receiving the leave request. The first indication information can be used to respond to the leave request or configure a resource required by the terminal when returning to the network.

A seventh preset condition: the terminal leaves the network autonomously.

In this embodiment, by setting the preset conditions, it can be clear under what circumstances the terminal should send the return notification, so that the terminal can timely and effectively notify the network side that the terminal has returned to the network, enabling the terminal to receive or send data normally. Under some conditions, for example, when other behaviors of the terminal are triggered to cause uplink sending, the terminal can also notify the network that the terminal has returned to the network without sending unnecessary return notifications, thus saving network resources.

In some embodiments, the determining whether to send a return notification to a network includes:

determining, by a MAC layer of the terminal, whether to send the return notification to the network; or determining, by a radio resource control (RRC) layer of the terminal, whether to send the return notification to the network.

In an example, before the determining whether to send the return notification to the network, the MAC layer of the terminal determines that the terminal returns to the network; or the MAC layer of the terminal receives the indication information of the RRC layer, and the indication information instructs the terminal to return to the network.

In this embodiment, the terminal may be a multi-SIM terminal and may camp on a plurality of networks. However, the terminal of this embodiment is not limited to a multi-SIM terminal, and may also be a single-SIM terminal.

In some embodiments, for example, the terminal can camp on a plurality of networks, where the plurality of networks include a network A and a network B, and the MAC layer of the terminal determines whether to send the return notification to the network. The multi-SIM terminal is in a connection state in the network A and sends a leave notification to the network A; then the multi-SIM terminal stays in an RRC connection state in the network A, switches to the network B to initiate RRC connection or recovery, and processes corresponding services; and the multi-SIM terminal decides to return to the network A when the service in the network B is finished and/or there is no service to be processed, and in this case, the RRC layer of the multi-SIM terminal indicates, to the MAC layer, that the terminal returns to the network. Once the indication from the RRC is received or the MAC determines that the terminal has returned to the network, the MAC layer determines whether to send the return notification to the network A based on whether the preset condition is met or not, and sends the return notification to the network A if the preset condition is met.

That the multi-SIM terminal stays in an RRC connection state in the network A may be staying in the RRC connection state after sending the leave notification or receiving a response message from the network A, and the response message explicitly or implicitly instructs the terminal to stay in the RRC connection state.

In some embodiments, before the determining whether to send the return notification to the network, the method further includes at least one of the following:

requesting or indicating, by an RRC layer of the terminal, to restore a packet data convergence protocol (PDCP) layer of the terminal; or requesting, by the RRC layer of the terminal, the PDCP layer of the terminal to indicate whether there is uplink data to be sent.

For example, the terminal can camp on a plurality of networks, where the plurality of networks include a network A and a network B, and the RRC layer of the terminal determines whether to send the return notification to the network. The multi-SIM terminal is in a connection state in the network A and sends a leave notification to the network A; then the multi-SIM terminal stays in an RRC connection state in the network A, switches to the network B to initiate RRC connection or recovery, and processes corresponding services; and the multi-SIM terminal decides to return to the network A when the service in the network B is finished and/or there is no service to be processed, and in this case, the RRC layer of the multi-SIM terminal indicates, to the MAC layer, that the terminal returns to the network. When the terminal returns to the network A, the RRC layer requests or indicates to restore the PDCP; the PDCP determines whether there is uplink data, and indicates whether there is uplink data to the RRC layer; if there is uplink data, the PDCP also sends data to an underlying Radio Link Control (RLC) protocol layer and/or the MAC layer; and after the RRC layer receives the PDCP indication, if the PDCP indication indicates that there is no uplink data to send, the RRC layer generates the return notification and sends the return notification to the MAC layer for transmission.

In some embodiments, after it is determined to send the return notification to the network, the sending the return notification to the network includes at least one of the following:

generating or triggering a BSR;

generating a MAC control element (CE), where the MAC CE is used to instruct the terminal to return to the network;

triggering a dedicated Scheduling Request (SR), where the SR is used to instruct the terminal to return to the network;

requesting, by a MAC layer of the terminal, an RRC layer to generate the return notification, where before this, the RRC layer sends a request or an indication to the MAC layer to indicate that the terminal has returned to the network;

requesting, by the RRC layer of the terminal, the MAC layer to generate the return notification;

generating, by the RRC layer, the return notification;

sending, by the MAC layer of the terminal, the return notification generated at the RRC layer, where before this, the MAC layer receives the return notification generated at the RRC layer from the RRC layer, and further, the RRC layer indicates that current message content is the return notification;

initiating random access; or triggering Channel State Information (CSI) reporting or Sounding Reference Signal (SRS) sending.

In some embodiments, when the terminal returns to the network, the existing BSR trigger condition may not be met, so it is necessary to introduce a new BSR trigger condition, that is, the BSR is triggered when the terminal returns to the network. The BSR can be any one of a conventional BSR, a periodic BSR, an empty BSR, or a pre-emptive BSR. The empty BSR indicates that there is no valid data in the BSR.

In some embodiments, the MAC CE used to indicate that the terminal returns to the network includes a specific LCID field and/or a specific numerical field, where the LCID field can be referred to as a MAC sub-header, and the specific numerical field can be referred to as a MAC protocol data unit.

In some examples, as shown in FIG. 4, the MAC CE may include only one LCID field, and when the LCID field takes a value of a first preset value, it indicates that the terminal returns to the network or that the terminal can normally send and receive data.

Figure 5:
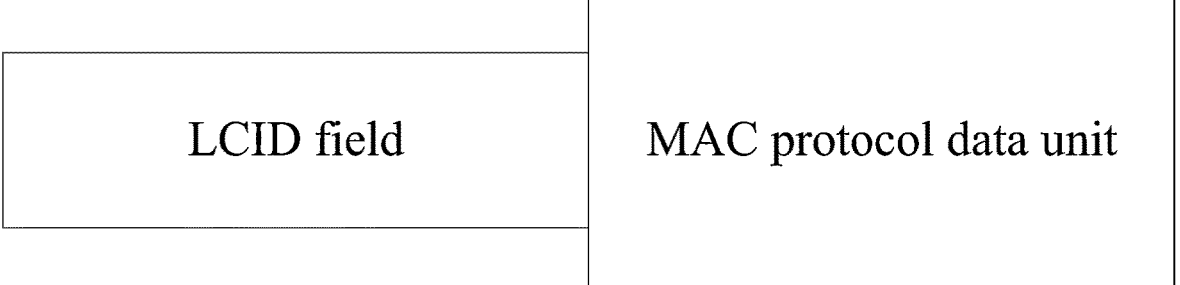

In some examples, as shown in FIG. 5, the MAC CE includes one LCID field (the value can be a first preset value) and one numerical field (or a direction field). When the MAC CE is received, if the LCID field is the first preset value, it indicates that the UE returns to the network. When a value of the direction field is 1, it indicates that the UE is ready to receive downlink data, and if the value is 0, it indicates that the UE requests the network side to start uplink scheduling.

In some embodiments, the LCID field can also be replaced with an extended logical channel identifier (eL-CID). The eLCID field includes a first parameter (such as Codepoint) and a second parameter (such as Index).

In some embodiments, the BSR meets any one of the following:

a buffer size field does not appear;

a value of the buffer size field is a preset value such as 0;

a value of an LCID field is a preset value such as 000; or the BSR is empty, when the BSR meets any one of the above items, the BSR indicates that the terminal returns to the network.

In some embodiments, if the terminal has a dedicated SR resource, the SR is sent.

In some embodiments, if the terminal has a PUSCH resource, any one of the following is performed:

sending the BSR;

sending the MAC CE;

generating, by the RRC layer, the return notification;

requesting, by a MAC layer of the terminal, an RRC layer to generate the return notification;

requesting, by the RRC layer of the terminal, the MAC layer to generate the return notification; or sending, by the MAC layer of the terminal, the return notification generated at the RRC layer.

In some embodiments, the PUSCH resource may be a resource dedicated for the terminal to send the return notification.

In some embodiments, if the terminal does not have an available PUSCH resource and/or physical uplink control channel (PUCCH) resource, random access is initiate. If the UE has a dedicated Random Access Channel (RACH) resource, random access is performed by using the dedicated RACH resource, and if not, the UE performs contention RACH.

In some embodiments, if the terminal has a dedicated resource for CSI or SRS reporting, CSI reporting or SRS sending is triggered.

In some embodiments, before it is determined to send the return notification to the network, the method further includes:

obtaining a configuration of a first resource of the network, so as to use the first resource to send the return notification to the network. The configuration of the first resource can be to keep the existing configuration of the terminal, or it can be obtained by the terminal from the network side, for example, the configuration of the first resource carried in the response message sent by the network A to the leave notification of the terminal.

In some embodiments, the first resource includes at least one of the following:

a configured grant type 1;

a configured grant type 2;

a physical uplink shared channel (PUSCH) resource;

a physical uplink control channel (PUCCH) resource;

a dedicated scheduling request (SR) resource;

a dedicated random access channel (RACH) resource;

a dedicated sounding reference signal (SRS) resource; or a dedicated channel state information (CSI) reporting resource.

In some embodiments, that the terminal returns to the network includes at least one of the following:

returning to the network before a gap ends or returning to the network without an agreed gap length;

returning to the network at or before a first moment, where the first moment is before the end of the gap and there are T seconds from the end of the gap, and T is configured by the network or agreed by a protocol; or returning to the network after the gap scheduled by the network ends.

The gap is determined by negotiation between the terminal and the network or an autonomous gap.

The gap can be understood as a period of time or a period of time that appears periodically. During this period, the terminal does not monitor scheduling or send and receive data in the current network (such as the network A), but switches to other networks to perform some services. At or after the end of the gap, the terminal should return to the network A, start to resume monitoring scheduling or start to send and receive data. The gap can be reported by the terminal to the network or configured by the network to the terminal, where the gap can include at least one of the following items: a duration/length, a gap start time, a gap end time, a gap period, for Multi-SIM purpose, and addition or modification or release of a gap configuration.

In some embodiments, when the UE receives an RRC release message in the network A or the UE locally releases the RRC connection, or the UE enters an RRC idle or inactive state, the UE does not send busy indication information, or the UE discards generated busy indication information, including the following steps.

Step 1: The UE is in a connection state in the network A.

Step 2: The UE receives a paging message in the network B.

Step 3: The UE decides to send a busy indication in the network B, for example, the UE decides that the service of the network A is important and/or the service of the network B is not a voice service, and the UE decides to notify the network B that the UE will process services in the network A in the future.

Step 4: The UE sends a leave request in the network A or applies to the network A for a gap, to switch to the network B to send a busy indication.

Step 5: The UE receives a connection release message sent by the network A.

Step 6: The UE does not send the busy indication to the network B, or the UE discards the busy indication if the busy indication has been generated.

Step 7: The UE can initiate RRC connection in the network B.

It should be noted that a notification method for returning to a network according to an embodiment of this application may be performed by a notification apparatus for returning to a network, or a module for performing and loading the notification method for returning to a network in the notification apparatus for returning to a network. In this embodiment of this application, the notification method for returning to a network according to an embodiment of this application is described by using an example in which the notification apparatus for returning to a network performs and loads the notification method for returning to a network.

Figure 6:
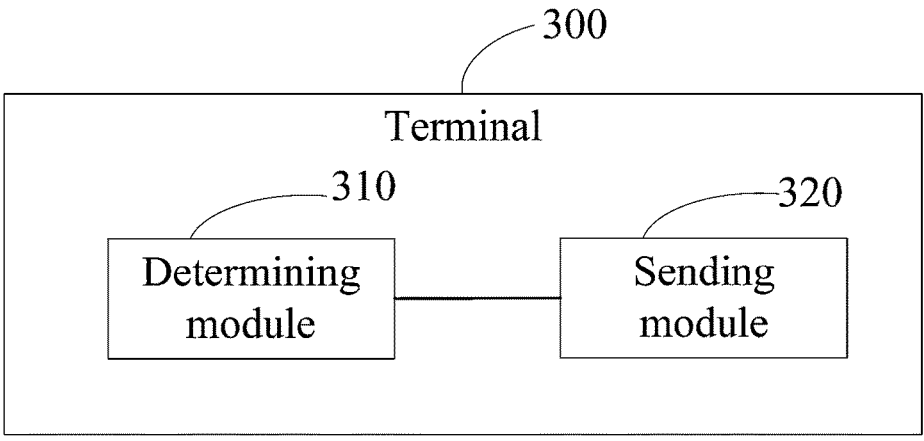
FIG. 6 is a schematic diagram of a structure of a notification apparatus for returning to a network according to an embodiment of this application.

An embodiment of this application provides a notification apparatus for returning to a network, applied to a terminal 300. As shown in FIG. 6, the apparatus includes:

a determining module 310, configured to determine whether to send a return notification to a network; and a sending module 320, configured to: if it is determined to send the return notification to the network, send the return notification to the network.

In the embodiments of this application, the terminal determines whether to send the return notification to the network, and if it is determined to send the return notification to the network, the terminal sends the return notification to the network, so that the terminal can timely and effectively notify a network side that the terminal has returned to the network, enabling the terminal to receive or send data normally. Under some conditions, for example, when other behaviors of the terminal are triggered to cause uplink sending, the terminal can also notify the network that the terminal has returned to the network without sending unnecessary return notifications, thus saving network resources.

In some embodiments, the determining module is configured to determine to send the return notification to the network when a preset condition is met, where the preset condition includes at least one of the following items.

A first preset condition: when the terminal returns to the network, there is no uplink data and/or signaling to be sent.

In some embodiments, the first preset condition is determined based on at least one of the following:

an indication of a MAC layer of the terminal, an indication of an RRC layer of the terminal, an indication of a service data adaptation protocol (SDAP) layer of the terminal, an indication of a PDCP layer of the terminal, and an indication of a physical layer of the terminal. It can be understood that there may be a request and response process between different protocol layers of the terminal. For example, the RRC layer of the terminal requests the MAC layer of the terminal to indicate whether the terminal currently has uplink data or signaling to be sent (for example, there is data in the buffer). When there is uplink data or signaling to be sent, the MAC layer of the terminal sends indication information to the RRC layer. In an implementation, when the terminal returns to the network, at least one of SDAP, PDCP, RRC, MAC, and PHY of the terminal is recovered or restarted, and new uplink data is generated after recovery or restart.

A second preset condition: when the terminal returns to the network, no buffer status report (BSR) is triggered.

A third preset condition: when the terminal returns to the network, the buffer status report (BSR) is triggered, but there is no resource for sending the BSR. For example, the terminal has no PUSCH resource, or the terminal has no resource dedicated to sending the BSR.

A fourth preset condition: when the terminal returns to the network, there is uplink data to be sent, but the uplink data has triggered the BSR, and there is no resource for sending the uplink data.

The resource for sending the uplink data includes a configured grant or a dynamic grant. For example, before leaving the network, UE triggers the BSR, and the network can allocate some transmission resources for the UE based on the BSR. Then, because the UE leaves the network, the network decides to temporarily suspend the allocated transmission resources, that is, the UE cannot use these resources for transmission. When the UE returns to the network, these resources are still in a suspended state, and the UE may not be able to trigger the BSR at this time because the UE doesn't meet triggering conditions of the BSR. As a result, the suspended transmission resources cannot be recovered. In this case, the UE should send the return notification to a network side.

A fifth preset condition: the network configures the terminal to send the return notification.

A sixth preset condition: before returning to the network, the terminal leaves the network based on first indication information of the network. In an implementation, before leaving the network, the terminal sends a leave request to the network side, and the network side sends the first indication information after receiving the leave request. The first indication information can be used to respond to the leave request or configure a resource required by the terminal when returning to the network.

A seventh preset condition: the terminal leaves the network autonomously.

In this embodiment, by setting the preset conditions, it can be clear under what circumstances the terminal should send the return notification, so that the terminal can timely and effectively notify the network side that the terminal has returned to the network, enabling the terminal to receive or send data normally. Under some conditions, for example, when other behaviors of the terminal are triggered to cause uplink sending, the terminal can also notify the network that the terminal has returned to the network without sending unnecessary return notifications, thus saving network resources.

In some embodiments, the sending module is configured to perform at least one of the following:

generating or triggering a BSR;

generating a MAC control element (CE), where the MAC CE is used to instruct the terminal to return to the network;

triggering an SR;

requesting, by a MAC layer of the terminal, an RRC layer to generate the return notification;

requesting, by the RRC layer of the terminal, the MAC layer to generate the return notification;

generating, by the RRC layer, the return notification;

sending, by the MAC layer of the terminal, the return notification generated at the RRC layer;

initiating random access; and triggering CSI reporting or SRS sending.

In some embodiments, when the terminal returns to the network, the existing BSR trigger condition may not be met, so it is necessary to introduce a new BSR trigger condition, that is, the BSR is triggered when the terminal returns to the network. The BSR can be any one of a conventional BSR, a periodic BSR, an empty BSR, and a pre-emptive BSR. The empty BSR indicates that there is no valid data in the BSR.

In some embodiments, the MAC CE used to indicate that the terminal returns to the network includes a specific LCID field and/or a specific numerical field, where the LCID field can be referred to as a MAC sub-header, and the specific numerical field can be referred to as a MAC protocol data unit.

In some examples, as shown in FIG. 4, the MAC CE may include only one LCID field, and when the LCID field takes a value of a first preset value, it indicates that the terminal returns to the network or that the terminal can normally send and receive data.

In some examples, as shown in FIG. 5, the MAC CE includes one LCID field (the value can be a first preset value) and one numerical field (or a direction field). When the MAC CE is received, if the LCID field is the first preset value, it indicates that the UE returns to the network. When a value of the direction field is 1, it indicates that the UE is ready to receive downlink data, and if the value is 0, it indicates that the UE requests the network side to start uplink scheduling.

In other embodiments, the LCID field can also be replaced with an extended logical channel identifier (eLCID). The eLCID field includes a first parameter (such as Codepoint) and a second parameter (such as Index).

In some embodiments, the BSR meets any one of the following:

a buffer size field does not appear;

a value of the buffer size field is a preset value;

a value of an LCID field is a preset value; and the BSR is empty.

In some embodiments, the sending module is configured to: if the terminal has a dedicated SR resource, send the SR.

In some embodiments, the sending module is configured to: if the terminal has a PUSCH resource, perform any one of the following:

sending the BSR;

sending the MAC CE;

generating, by the RRC layer, the return notification;

requesting, by a MAC layer of the terminal, an RRC layer to generate the return notification;

requesting, by the RRC layer of the terminal, the MAC layer to generate the return notification; and sending, by the MAC layer of the terminal, the return notification generated at the RRC layer.

In some embodiments, the PUSCH resource may be a resource dedicated for the terminal to send the return notification.

In some embodiments, the sending module is configured to: if the terminal does not have an available PUSCH resource and/or PUCCH resource, initiate random access. If the UE has a dedicated random access channel (RACH) resource, random access is performed by using the dedicated RACH resource, and if not, the UE performs contention RACH.

In some embodiments, the sending module is configured to: if the terminal has a dedicated resource for CSI or SRS reporting, trigger CSI reporting or SRS sending.

In some embodiments, the apparatus further includes a processing module, configured to perform at least one of the following:

requesting or indicating to restore a packet data convergence protocol (PDCP) layer of the terminal; and requesting the PDCP layer of the terminal to indicate whether there is uplink data to be sent.

In some embodiments, the apparatus further includes:

an obtaining module, configured to obtain a configuration of a first resource of the network, so as to use the first resource to send the return notification to the network.

In some embodiments, the first resource includes at least one of the following:

a configured grant type 1;

a configured grant type 2;

a physical uplink shared channel (PUSCH) resource;

a physical uplink control channel (PUCCH) resource;

a dedicated scheduling request (SR) resource;

a dedicated random access channel (RACH) resource;

a dedicated sounding reference signal (SRS) resource; and a dedicated channel state information (CSI) reporting resource.

In some embodiments, that the terminal returns to the network includes at least one of the following:

returning to the network before a gap ends or returning to the network without an agreed gap length;

returning to the network at or before a first moment, where the first moment is before the end of the gap and there are T seconds from the end of the gap, and T is configured by the network or agreed by a protocol; and returning to the network after the gap scheduled by the network ends.

The gap is determined by negotiation between the terminal and the network or an autonomous gap.

The gap can be understood as a period of time or a period of time that appears periodically. During this period, the terminal does not monitor scheduling or send and receive data in the current network (such as the network A), but switches to other networks to perform some services. At or after the end of the gap, the terminal should return to the network A, start to resume monitoring scheduling or start to send and receive data. The gap can be reported by the terminal to the network or configured by the network to the terminal, where the gap can include at least one of the following items: a duration/length, a gap start time, a gap end time, a gap period, for Multi-SIM purpose, and addition or modification or release of a gap configuration.

The notification apparatus for returning to a network in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a network attached storage (NAS), a personal computer (PC), a television (TV), a teller machine, a self-service machine, or the like. This is not specifically limited in the embodiments of this application.

The notification apparatus for returning to a network in this embodiment of this application may be an apparatus with an operating system. The operating system may be an Android operating system, may be an iOS operating system, or may be another possible operating system. This is not specifically limited in this embodiment of this application.

An embodiment of this application further provides a terminal, including a processor, a memory, and a program or an instruction stored in the memory and executable on the processor. When the program or the instruction is executed by the processor, the processes of the embodiment of the notification method for returning to a network are implemented, and a same technical effect can be achieved. To avoid repetition, details are not described herein again.

It should be noted that the terminal in this embodiment of this application includes the mobile electronic device and the non-mobile electronic device described above.

Figure 7:
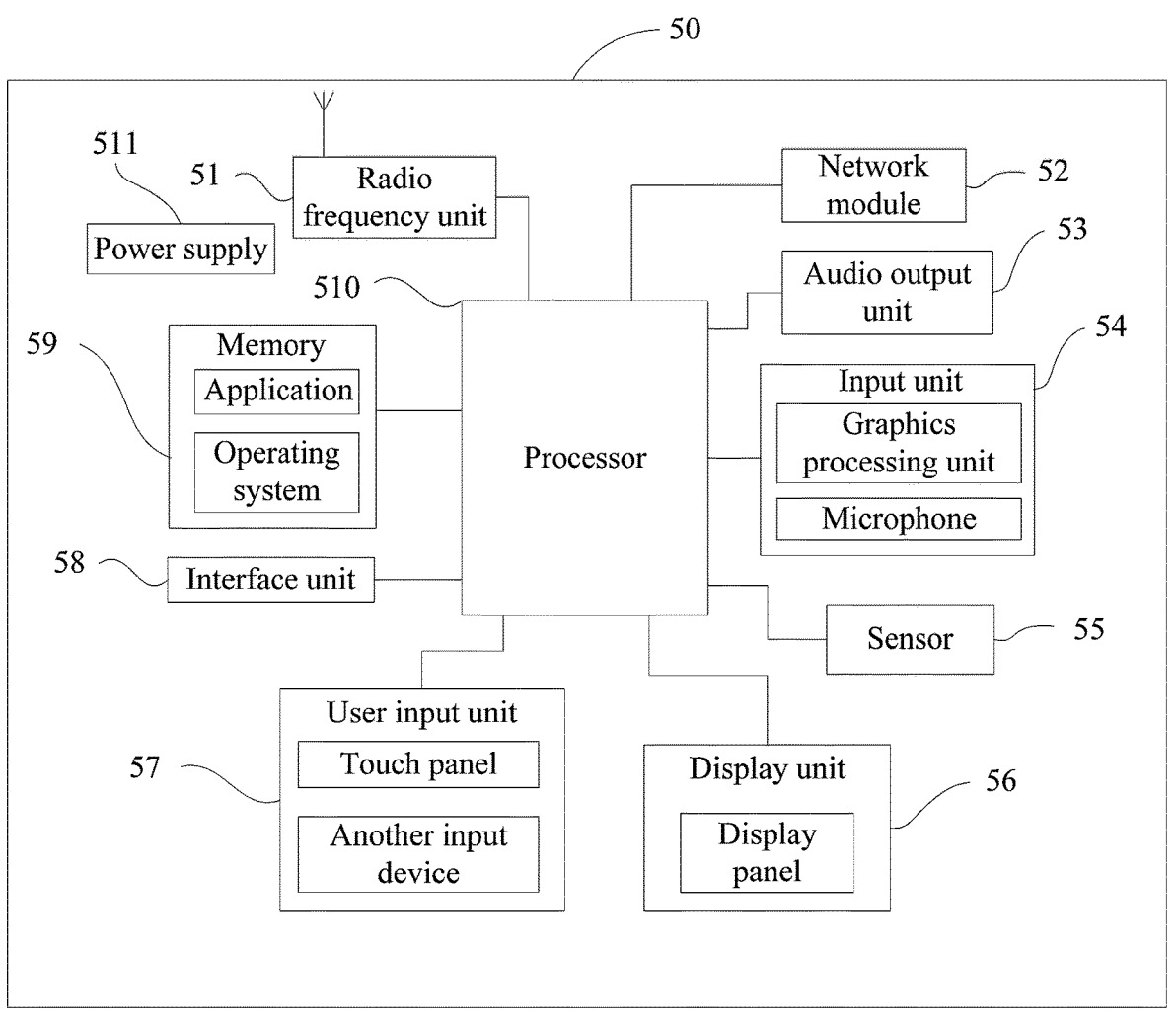
FIG. 7 is a schematic diagram of composition of a terminal according to an embodiment of this application.

FIG. 7 is a schematic diagram of a hardware structure of a terminal according to the embodiments of this application. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. It can be understood by a person skilled in the art that, the terminal structure shown in FIG. 7 does not constitute any limitation on the terminal, and the terminal may include more or fewer components than those shown in the figure, or combine some components, or have different component arrangements. In this embodiment of this application, the terminal includes but is not limited to a mobile phone, a tablet computer, a notebook computer, a palmtop computer, an in-vehicle terminal, a wearable device, a pedometer, and the like.

It should be understood that, in this embodiment of this application, the radio frequency unit 51 may be configured to receive and send information or a signal in a call process. In some embodiments, after receiving downlink data from a base station, the radio frequency unit sends the downlink data to the processor 510 for processing. In addition, the radio frequency unit sends uplink data to the base station. Usually, the radio frequency unit 51 includes but is not limited to an antenna, at least one amplifier, a transceiver, a coupler, a low noise amplifier, a duplexer, and the like. In addition, the radio frequency unit 51 may further communicate with a network and another device through a wireless communications system.

The memory 59 may be configured to store a software program and various pieces of data. The memory 59 may mainly include a program storage region and a data storage region. The program storage region may store an operating system, an application required by at least one function (such as a sound play function or an image play function), and the like. The data storage region may store data (such as audio data or an address book) created based on use of the mobile phone, and the like. In addition, the memory 59 may include a high-speed random access memory, and may further include a nonvolatile memory, for example, at least one magnetic disk storage device, a flash storage device, or another volatile solid-state storage device.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or more processing units. In some embodiments, an application processor and a modem processor may be integrated into the processor 510. The application processor primarily processes an operating system, a user interface, an application, and the like. The modem processor mainly processes wireless communication. It can be understood that, the modem processor may not be integrated into the processor 510.

The terminal 50 may further include the power supply 511 (such as a battery) that supplies power to each component. In some embodiments, the power supply 511 may be logically connected to the processor 510 by using a power management system, so as to implement functions such as charging, discharging, and power consumption management by using the power management system.

In addition, the terminal 50 includes some function modules not shown, and details are not described herein.

In some embodiments, the processor 510 is configured to determine whether to send a return notification to a network; and if it is determined to send the return notification to the network, the radio frequency unit 51 is configured to send the return notification to the network.

In some embodiments, the processor 510 is configured to determine to send the return notification to the network when a preset condition is met, where the preset condition includes at least one of the following:

a first preset condition: when the terminal returns to the network, there is no uplink data and/or signaling to be sent;

a second preset condition: when the terminal returns to the network, no buffer status report (BSR) is triggered;

a third preset condition: when the terminal returns to the network, the buffer status report (BSR) is triggered, but there is no resource for sending the BSR;

a fourth preset condition: when the terminal returns to the network, there is uplink data to be sent, but the uplink data has triggered the BSR, and there is no resource for sending the uplink data;

a fifth preset condition: the network configures the terminal to send the return notification;

a sixth preset condition: before returning to the network, the terminal leaves the network based on first indication information of the network; and a seventh preset condition: the terminal leaves the network autonomously.

In some embodiments, the determining whether to send a return notification to a network includes:

determining, by a MAC layer of the terminal, whether to send the return notification to the network; or determining, by an RRC layer of the terminal, whether to send the return notification to the network.

In some embodiments, after the processor 510 determines to send the return notification to the network, the sending the return notification to the network includes at least one of the following:

generating or triggering a BSR;

generating a MAC control element (CE), where the MAC CE is used to instruct the terminal to return to the network;

triggering an SR;

requesting, by a MAC layer of the terminal, an RRC layer to generate the return notification;

requesting, by the RRC layer of the terminal, the MAC layer to generate the return notification;

generating, by the RRC layer, the return notification;

sending, by the MAC layer of the terminal, the return notification generated at the RRC layer;

initiating random access; and triggering CSI reporting or SRS sending.

In some embodiments, the MAC CE includes a specific LCID field and/or a specific numerical field.

In some embodiments, the BSR meets any one of the following:

a buffer size field does not appear;

a value of the buffer size field is a preset value;

a value of an LCID field is a preset value; and the BSR is empty.

In some embodiments, the radio frequency unit 51 is configured to: if the terminal has a dedicated SR resource, send the SR.

In some embodiments, the processor 510 is configured to: if the terminal has a PUSCH resource, any one of the following is performed:

sending the BSR;

sending the MAC CE;

generating, by the RRC layer, the return notification;

requesting, by a MAC layer of the terminal, an RRC layer to generate the return notification;

requesting, by the RRC layer of the terminal, the MAC layer to generate the return notification; and sending, by the MAC layer of the terminal, the return notification generated at the RRC layer.

In some embodiments, the processor 510 is configured to: if the terminal has no available PUSCH resource and/or PUCCH resource, initiate random access.

In some embodiments, the processor 510 is configured to: if the terminal has a dedicated resource for CSI or SRS reporting, trigger CSI reporting or SRS sending.

In some embodiments, the processor 510 is further configured to perform at least one of the following:

requesting or indicating, by an RRC layer of the terminal, to restore a packet data convergence protocol (PDCP) layer of the terminal; and requesting, by the RRC layer of the terminal, the PDCP layer of the terminal to indicate whether there is uplink data to be sent.

In some embodiments, the radio frequency unit 51 is further configured to obtain a configuration of a first resource of the network, so as to use the first resource to send the return notification to the network.

In some embodiments, the first resource includes at least one of the following:

a configured grant type 1;

a configured grant type 2;

a physical uplink shared channel (PUSCH) resource;

a physical uplink control channel (PUCCH) resource;

a dedicated scheduling request (SR) resource;

a dedicated random access channel (RACH) resource;

a dedicated sounding reference signal (SRS) resource; and a dedicated channel state information (CSI) reporting resource.

In some embodiments, the first preset condition is determined based on at least one of the following:

an indication of a MAC layer of the terminal, an indication of an RRC layer of the terminal, an indication of a service data adaptation protocol (SDAP) layer of the terminal, an indication of a PDCP layer of the terminal, and an indication of a physical layer of the terminal.

In some embodiments, that the terminal returns to the network includes at least one of the following:

returning to the network before a gap ends or returning to the network without an agreed gap length;

returning to the network at or before a first moment, where the first moment is before the end of the gap and there are T seconds from the end of the gap, and T is configured by the network or agreed by a protocol; and returning to the network after the gap scheduled by the network ends.

An embodiment of this application further provides a readable storage medium. The readable storage medium stores a program or an instruction, and when the program or the instruction is executed by a processor, the processes of the embodiment of the notification method for returning to a network are implemented, and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the embodiment of the notification method for returning to a network, and a same technical effect can be achieved. To avoid repetition, details are not described herein again.

It should be understood that the chip mentioned in this embodiment of this application may also be referred to as a system-level chip, a system chip, a system on chip, a system chip on chip, and the like.

It should be noted that, in this specification, the term "include", "comprise", or any other variant thereof is intended to cover a non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as an ROM/RAM, a hard disk, or an optical disc), and includes several instructions for instructing a terminal (which may be a mobile phone, a computer, a server, a network device, or the like) to perform the methods described in the embodiments of this application.

The embodiments of this application are described above in conjunction with the accompanying drawings, but this application is not limited to the above implementations, and the above implementations are only illustrative and not restrictive. Enlightened by this application, a person of ordinary skill in the art can make many forms without departing from the purpose of this application and the protection scope of the claims, all of which fall within the protection of this application.

The invention claimed is:

1. A notification method for returning to a network, performed by a terminal, comprising:
    when the terminal returns to the network before a gap ends, determining, by a media access control (MAC) layer of the terminal, whether to send a return notification to the network; and
    when it is determined to send the return notification to the network, sending the return notification to the network,
    wherein sending the return notification to the network comprises:
    initiating random access,
    wherein the gap is a Multi-SIM gap, and the terminal is a multi-SIM terminal.

2. The notification method according to claim 1, wherein determining whether to send the return notification to the network comprises:
    determining to send the return notification to the network when a preset condition is met, wherein the preset condition comprises at least one of the following:
        a first preset condition: when the terminal returns to the network, there is no uplink data or signaling to be sent;
        a second preset condition: when the terminal returns to the network, no buffer status report (BSR) is triggered;
        a third preset condition: when the terminal returns to the network, the buffer status report (BSR) is triggered, but there is no resource for sending the BSR;
        a fourth preset condition: when the terminal returns to the network, there is uplink data to be sent, but the uplink data has triggered the BSR, and there is no resource for sending the uplink data;
        a fifth preset condition: the network configures the terminal to send the return notification;
        a sixth preset condition: before returning to the network, the terminal leaves the network based on first indication information of the network; or
        a seventh preset condition: the terminal leaves the network autonomously.

3. The notification method according to claim 2, wherein the first preset condition is determined based on at least one of the following:
    an indication of the MAC layer of the terminal, an indication of an RRC layer of the terminal, an indication of a service data adaptation protocol (SDAP) layer of the terminal, an indication of a PDCP layer of the terminal, or an indication of a physical layer of the terminal.

4. The notification method for returning to a network according to claim 1, wherein when it is determined to send the return notification to the network, sending the return notification to the network further comprises at least one of the following:
    generating or triggering a BSR;
    generating a MAC control element (CE), wherein the MAC CE is used to instruct the terminal to return to the network;
    triggering a scheduling request (SR);
    requesting, by the MAC layer of the terminal, an RRC layer to generate the return notification;
    requesting, by the RRC layer of the terminal, the MAC layer to generate the return notification;
    generating, by the RRC layer, the return notification;
    sending, by the MAC layer of the terminal, the return notification generated at the RRC layer; or triggering channel state information (CSI) reporting or sounding reference signal (SRS) sending.

5. The notification method according to claim 4, wherein the MAC CE comprises a specific logical channel identifier (LCID) field or a specific numerical field.

6. The notification method according to claim 4, wherein the BSR meets any one of the following:

a buffer size field does not appear;

a value of the buffer size field is a preset value;

a value of an LCID field is a preset value; or the BSR is empty.

7. The notification method according to claim 4, wherein when the terminal has a dedicated SR resource, the SR is sent.

8. The notification method according to claim 4, wherein when the terminal has a physical uplink shared channel (PUSCH) resource, performing any one of the following:

sending the BSR;

sending the MAC CE;

generating, by the RRC layer, the return notification;

requesting, by the MAC layer of the terminal, the RRC layer to generate the return notification;

requesting, by the RRC layer of the terminal, the MAC layer to generate the return notification; or sending, by the MAC layer of the terminal, the return notification generated at the RRC layer.

9. The notification method according to claim 4, wherein when the terminal has a dedicated resource for CSI or SRS reporting, CSI reporting or SRS sending is triggered.

10. The notification method according to claim 1, wherein when the terminal has no available PUSCH resource or physical uplink control channel (PUCCH) resource, random access is initiated.

11. The notification method according to claim 1, wherein before determining whether to send the return notification to the network, the method further comprises at least one of the following:

requesting or indicating, by an RRC layer of the terminal, to restore a packet data convergence protocol (PDCP) layer of the terminal; or requesting, by the RRC layer of the terminal, the PDCP layer of the terminal to indicate whether there is uplink data to be sent.

12. The notification method according to claim 1, wherein before it is determined to send the return notification to the network, the method further comprises:

obtaining a configuration of a first resource of the network, so as to use the first resource to send the return notification to the network.

13. The notification method according to claim 12, wherein the first resource comprises at least one of the following:

a configured grant type 1;

a configured grant type 2;

a physical uplink shared channel (PUSCH) resource;

a physical uplink control channel (PUCCH) resource;

a dedicated scheduling request (SR) resource;

a dedicated random access channel (RACH) resource;

a dedicated sounding reference signal (SRS) resource; or a dedicated channel state information (CSI) reporting resource.

14. The notification method for returning to a network according to claim 1, wherein the gap is a period of time in which the terminal does not monitor scheduling or does not transmit data in the network.

15. A terminal, comprising:

a memory storing a computer program; and a processor coupled to the memory and configured to execute the computer program to perform operations comprising:

when the terminal returns to the network before a gap ends determining, by a media access control (MAC) layer of the terminal, whether to send a return notification to a network; and when it is determined to send the return notification to the network, sending the return notification to the network, wherein sending the return notification to the network comprises:

initiating random access, wherein the gap is a Multi-SIM gap, and the terminal is a multi-SIM terminal.

16. The terminal according to claim 15, wherein determining whether to send the return notification to the network comprises:

determining to send the return notification to the network when a preset condition is met, wherein the preset condition comprises at least one of the following:

a first preset condition: when the terminal returns to the network, there is no uplink data or signaling to be sent;

a second preset condition: when the terminal returns to the network, no buffer status report (BSR) is triggered;

a third preset condition: when the terminal returns to the network, the buffer status report (BSR) is triggered, but there is no resource for sending the BSR;

a fourth preset condition: when the terminal returns to the network, there is uplink data to be sent, but the uplink data has triggered the BSR, and there is no resource for sending the uplink data;

a fifth preset condition: the network configures the terminal to send the return notification;

a sixth preset condition: before returning to the network, the terminal leaves the network based on first indication information of the network; or a seventh preset condition: the terminal leaves the network autonomously.

17. The terminal according to claim 15, wherein when it is determined to send the return notification to the network, sending the return notification to the network further comprises at least one of the following:

generating or triggering a BSR;

generating a MAC control element (CE), wherein the MAC CE is used to instruct the terminal to return to the network;

triggering a scheduling request (SR);

requesting, by the MAC layer of the terminal, an RRC layer to generate the return notification;

requesting, by the RRC layer of the terminal, the MAC layer to generate the return notification;

generating, by the RRC layer, the return notification;

sending, by the MAC layer of the terminal, the return notification generated at the RRC layer; or triggering channel state information (CSI) reporting or sounding reference signal (SRS) sending.

18. The terminal according to claim 15, wherein the gap is a period of time in which the terminal does not monitor scheduling or does not transmit data in the network.

19. A non-transitory computer-readable storage medium, storing a computer program, when the computer program is executed by a processor of a terminal, causes the processor to perform operations comprising:

when the terminal returns to the network before a gap ends, determining, by a media access control (MAC) layer of the terminal, whether to send a return notification to a network; and when it is determined to send the return notification to the network, sending the return notification to the network, wherein sending the return notification to the network comprises:

initiating random access, wherein the gap is a Multi-SIM gap, and the terminal is a multi-SIM terminal.

20. The non-transitory computer-readable storage medium according to claim 19, wherein the gap is a period of time in which the terminal does not monitor scheduling or does not transmit data in the network.

\* \* \* \* \*